July 17, 1951  C. E. WALTON  2,561,159
SELF-LOCKING CLUTCH
Filed Sept. 14, 1944
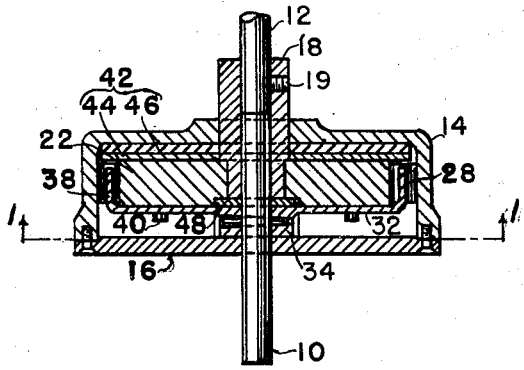
FIG. 2
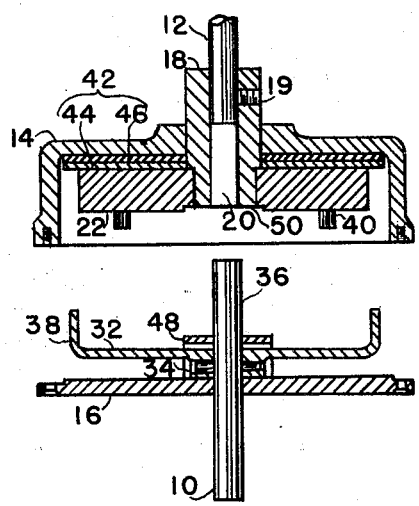
FIG. 3
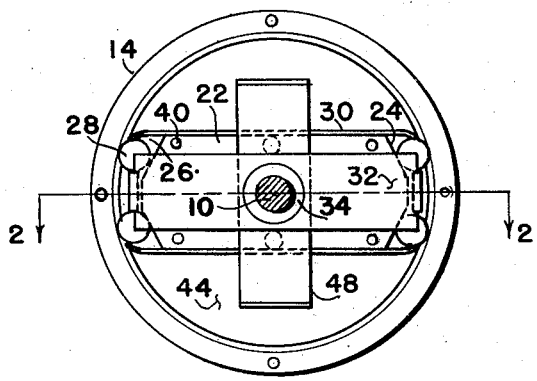
FIG. 1
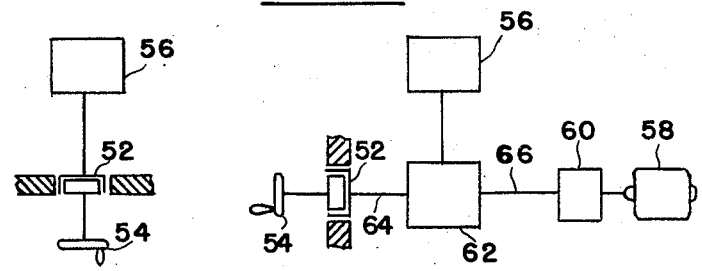
FIG. 4
FIG. 5
FIG. 6
Inventor
CECIL E. WALTON
By W. Glenn Jones
Attorney Patented July 17, 1951

2,561,159

UNITED STATES PATENT OFFICE 2,561,159

SELF-LOCKING CLUTCH

Cecil E. Walton, New London, Conn., assignor to the United States of America as represented by the Secretary of the Navy Application September 14, 1944, Serial No. 554,089

1 Claim. (Cl. 192—8)

The present invention relates to a self-locking clutch and particularly to a clutch which permits a drive from one to another of two axially aligned shafts, but locks against rotation when it is attempted to drive the former shaft from the latter.

The general object of the present invention is to provide a mechanism of this type to be used in conjunction with differential gearing. The present device may be described as a combined clutch and brake which will act as a clutch to transmit motion in either direction of rotation from a shaft, as a hand wheel shaft, to a driven shaft, but which will act as a brake to prevent rotation of the driven shaft if driving torque is applied to it from any other shafts.

Referring now to the drawings:

Fig. 1 is a plan view of the device from the driving end, with the cover plate removed;

Fig. 2 is a sectional view as indicated by lines 2—2 of Fig. 1;

Fig. 3 is a sectional view similar to Fig. 2 but showing the driving and driven portions separated; and, Figs. 4 to 6 are schematic diagrams showing the device in its relationship to other elements of the mechanism in which it is incorporated.

Referring now to Figs. 1, 2 and 3, the device couples a driving shaft 10 to a driven shaft 12. The working parts of the device are enclosed by a fixed drum 14 and cover plate 16 loose on the shaft 10. A hub 18 is secured to the driven shaft 12 by a set screw at 19 in such a manner that the shaft extends only part way into the hub leaving an opening 20 which forms a bearing to receive the end of the driving shaft 10.

The shafts 10 and 12 are coupled together as desired by a rolling key clutch consisting of balls or rollers wedged between the inner face of the drum 14 and inclined faces or ramps on a cooperating ramp member 22 secured to the hub 18. The ends of this ramp member are shaped to form four ramps 24 so made that they, in conjunction with the inner cylindrical surface of the drum 14, form wedged-shaped spaces 26 opening away from each other as shown in Fig. 1. Four rollers 28 are normally held by spring 30 in the narrower ends of these spaces, in contact simultaneously with the surfaces of the ramps and the drum.

An operating arm 32 is secured to the driving shaft 10 by means of a hub 34 in such a position that the protruding end of the shaft forms a journal 36 which runs in the bearing 20.

The ends of the operating arm 32 are bent over to form fingers 38 which enter, and are narrower than the space between the rollers 28, at either end of the ramp member 22. Pins 40 protruding from the ramp member 22 serve to transmit torque from the driving shaft 10 to the driven shaft 12 and to limit the motion of the operating arm 32 relative to the ramp member.

To assure smooth operation, a friction device 42 has been provided. It is composed of a plate 44 attached to the ramp member and bearing on a disc of felt 46 which is interposed between it and the drum 14. Friction sufficient to overcome the pressure of the springs 30 is produced in the friction device by the pressure of a leaf spring 48 carried in a notch 50 on the ramp member 22 and bearing against the cover plate 16.

The device operates as follows:

Driving torque applied directly to the driven shaft 12 tends to turn the ramp member 22 in relation to the fixed drum 14. This causes two of the rollers 28—those on the advance sides of the member, already held in contact with both the drum 14 and ramps 24 by the springs 30—to jam between the drum and ramp, preventing further relative motion and holding the shaft 12 stationary.

On the other hand, torque applied to the driving shaft 10 rotates the operating arm 32 in relation to the ramp member 22, which is restrained by the friction device 42. The fingers 38 engage two of the rollers 28 against the action of the springs 30. Because of the shape of the spring tips, these rollers are forced inward away from the face of the drum 14. The relative motion between the arm 32 and the member 22 continues until the arm contacts one of the driving pins 40 when its torque is applied to the member 22. Relative motion between the member 22 and the drum 14 moves the two remaining rollers 28 out of intimate contact with the two parts and permits the member to turn freely, except for friction in the friction device 42.

As indicated, Figs. 4 to 6 show schematically the use of the mechanism, generally represented at 52, as part of a system in such manner that it acts as a brake when power is applied to one of its associated shafts and as a reversible automatic clutch when power is applied to the other associated shaft.

The mechanism may be directly connected between a driving means 54, such as a hand wheel, and a driven object 56, as shown in Fig. 4, to prevent rotation of the object except as provided by the driving means 54.

If the driven object 56 is to be driven by two alternate means (Fig. 5) as, for instance, a hand wheel 54 or a motor 58 through a reduction gear 60, a differential gearing 62 would be provided. In order that the differential gearing may operate, it is necessary that one of the driven shafts, either 64 or 66, be held stationary when the other is turned. There is sufficient friction in the reduction gear 60 to achieve this in the case of shaft 66. In the case of shaft 64 insertion of the device of the present disclosure will give the same result.

If the motor 58 and reduction gear 60 are replaced either by a direct connected motor or by another hand wheel, there would not be sufficient friction to hold shaft 66 stationary, and installation of an additional device 52 in shaft 66 would be necessary, as shown in Fig. 6.

Obviously, various modifications in the form, proportions and arrangement of the device may be made without departing from the spirit or scope of this invention, as defined in the appended claim.

What is claimed is:

In an irreversible drive unit, a driven shaft, a driving shaft co-axial with and abutting said driving shaft, a drum coaxial with said shafts and overlapping the abutment thereof, a ramp member carried by said driven shaft having ends adjacent said drum, each of said ends having two similar surfaces inclined toward the axis of said ramp member, a roller positioned between said drum and said ramp member adjacent each of said inclined surfaces, a leaf spring adjacent each of said rollers urging the corresponding roller into frictional engagement with said drum and said inclined surface, an operating arm carried by said driving shaft having a finger interposed between the rollers at the ends of said ramp member, lost-motion means interconnecting said operating arm and said ramp member, and frictional means interconnecting said drum and said ramp member for yielding restraining movement therebetween by a torque exceeding the torque of said leaf springs whereby said ramp member is normally locked to said drum by said rollers until released by rotation of said operating arm by said driving shaft.

CECIL E. WALTON.

REFERENCES CITED

The following references are of record in the file of this patent:

UNITED STATES PATENTS

| Number | Name | Date |
|---|---|---|
| 945,909 | Chapman | Jan. 11, 1910 |
| 1,015,861 | Warner | Jan. 30, 1912 |
| 1,457,694 | Douglas | June 5, 1923 |
| 1,607,907 | Myers | Nov. 23, 1926 |
| 1,715,274 | Blaski | May 28, 1929 |
| 1,793,228 | Hackenthal | Feb. 17, 1931 |
| 1,942,472 | Crow | Jan. 9, 1934 |
| 1,996,365 | Clinedinst | Apr. 2, 1935 |
| 2,052,094 | Huff | Aug. 25, 1936 |
| 2,260,119 | Marshall | Oct. 21, 1941 |
| 2,370,976 | Lear | Mar. 6, 1945 |